United States Patent [19]
Toyoshima et al.

[11] Patent Number: 5,477,275
[45] Date of Patent: Dec. 19, 1995

[54] VIDEO SIGNAL RECEIVING SYSTEM WITH SIGNAL SOURCE SWITCHING BASED ON GENERATED CONTROL SIGNALS

[75] Inventors: Kenichiro Toyoshima; Hirofumi Usui, both of Tokyo, Japan

[73] Assignee: Sony Corporation, Tokyo, Japan

[21] Appl. No.: 311,274

[22] Filed: Sep. 23, 1994

[30] Foreign Application Priority Data

Oct. 2, 1993 [JP] Japan ................................ 5-270070
Oct. 28, 1993 [JP] Japan ................................ 5-292746

[51] Int. Cl.$^6$ .................................................. H04N 3/27
[52] U.S. Cl. ............................ 348/554; 348/706; 348/734
[58] Field of Search ..................................... 348/460, 734, 348/731, 706, 735, 554; H04N 3/27

[56] References Cited

U.S. PATENT DOCUMENTS

| | | | |
|---|---|---|---|
| 4,405,946 | 9/1983 | Knight | 348/554 |
| 4,677,488 | 6/1987 | Zato | 348/706 |
| 4,748,684 | 5/1988 | Wright, Jr. | 348/735 |
| 4,805,020 | 2/1989 | Greenberg | 348/460 |
| 5,181,113 | 1/1993 | Chang | 348/554 |
| 5,257,106 | 10/1993 | Maruoka | 348/706 |
| 5,285,284 | 2/1994 | Takashima | 348/731 |
| 5,315,391 | 5/1994 | Lee | 348/554 |

*Primary Examiner*—Victor R. Kostak
*Attorney, Agent, or Firm*—Jay H. Maioli

[57] ABSTRACT

A video signal receiving system having a plurality of video signal receiving apparatuses wherein use of a remote commander for one of the plurality of video signal receiving apparatuses allows a user to remotely control others of the plurality of video signal receiving apparatuses. Additionally, if such remote control is not direct control but composite control that requires control by a microcomputer, use of the above-mentioned remote commander allows the user to perform the composite control over the above-mentioned other video signal receiving apparatuses without adding necessary composite control capabilities to the other video signal receiving apparatuses.

6 Claims, 15 Drawing Sheets

FIG. 2

| | | |
|---|---|---|
| 1 ABC | 2 DIS | 3 CNN |
| 4 ESPN | 5 ---- | 6 ---- |
| 7 ---- | 8 ---- | 9 ---- |
| D ---- | 0 ---- | E ---- |

FIG. 3

1 ABC
2 DIS
↕ ▷ 3 CNN
4 ESPN
5 ----
6 ----
7 ----
8 ----

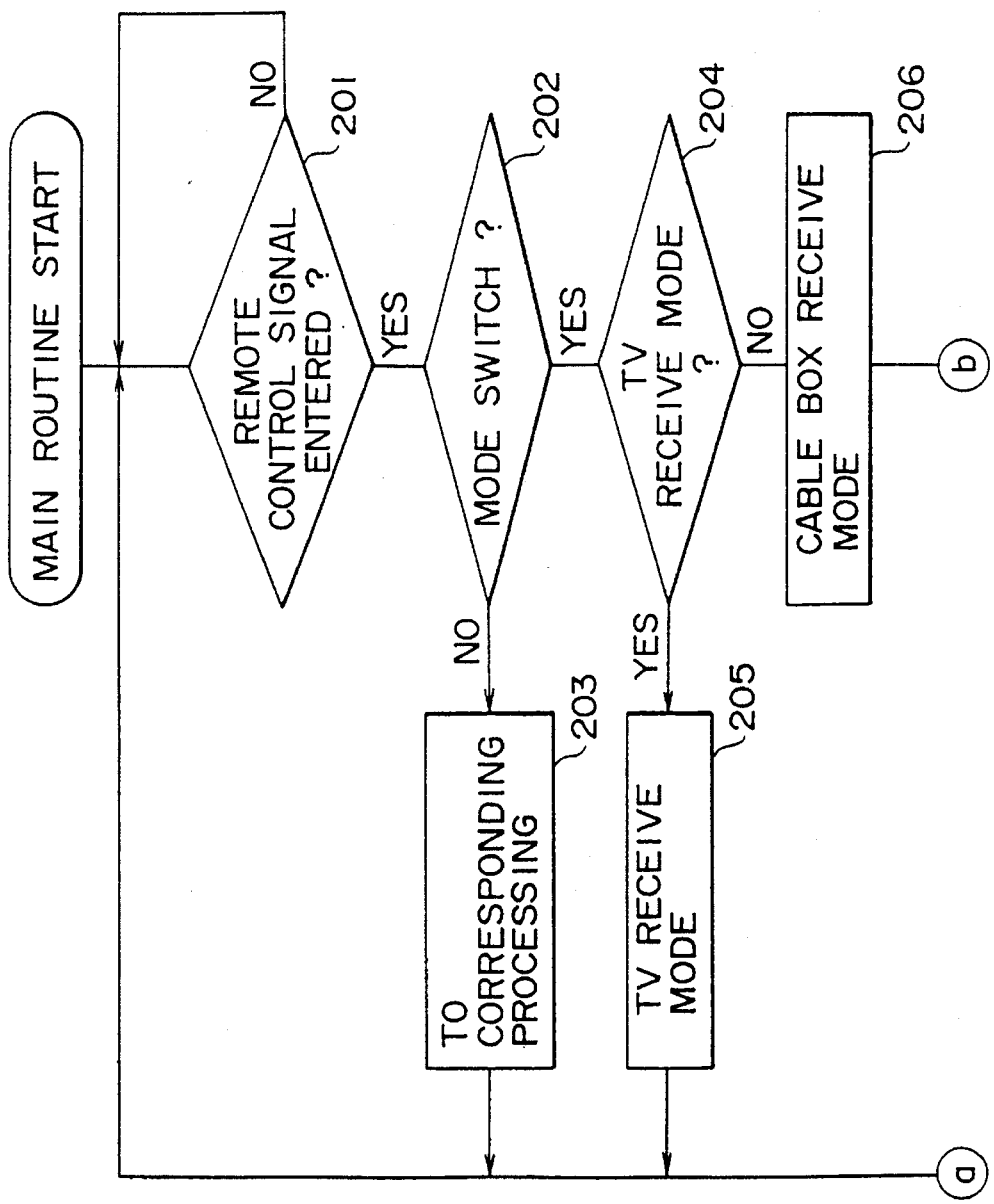

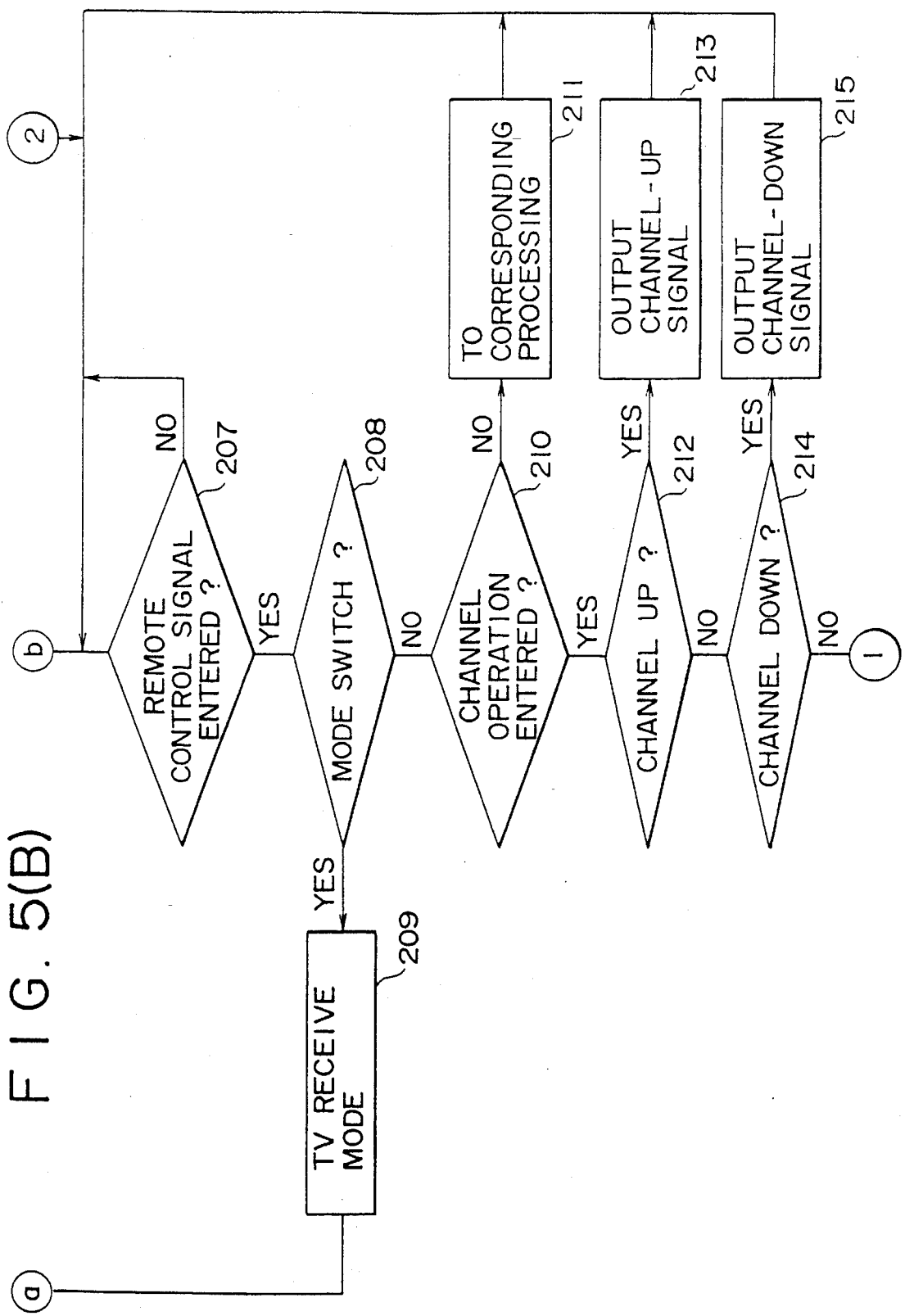

F I G. 14(A)
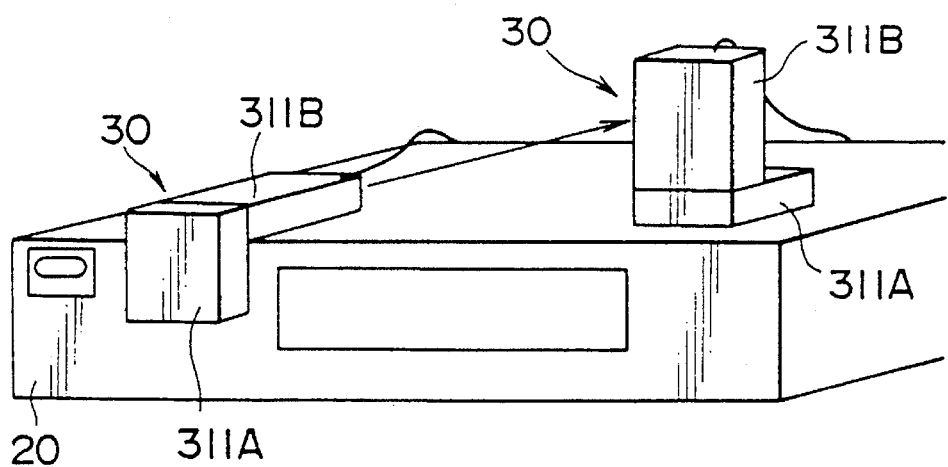
F I G. 14(B)
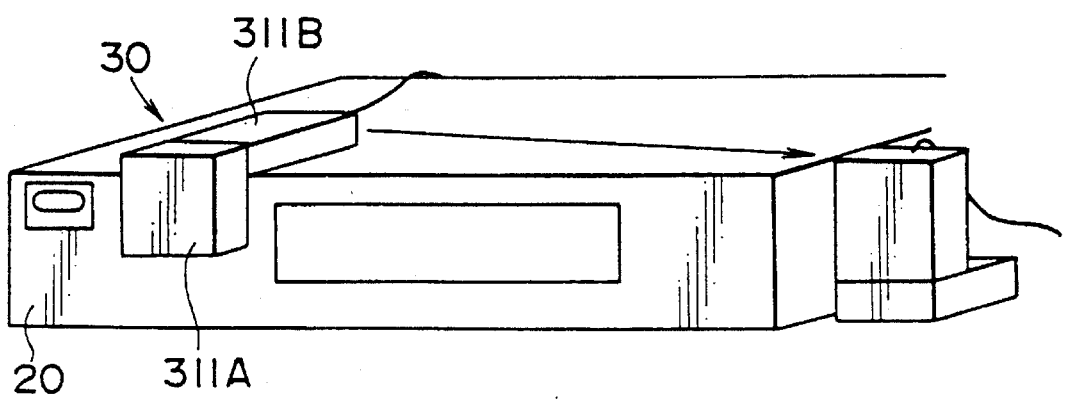

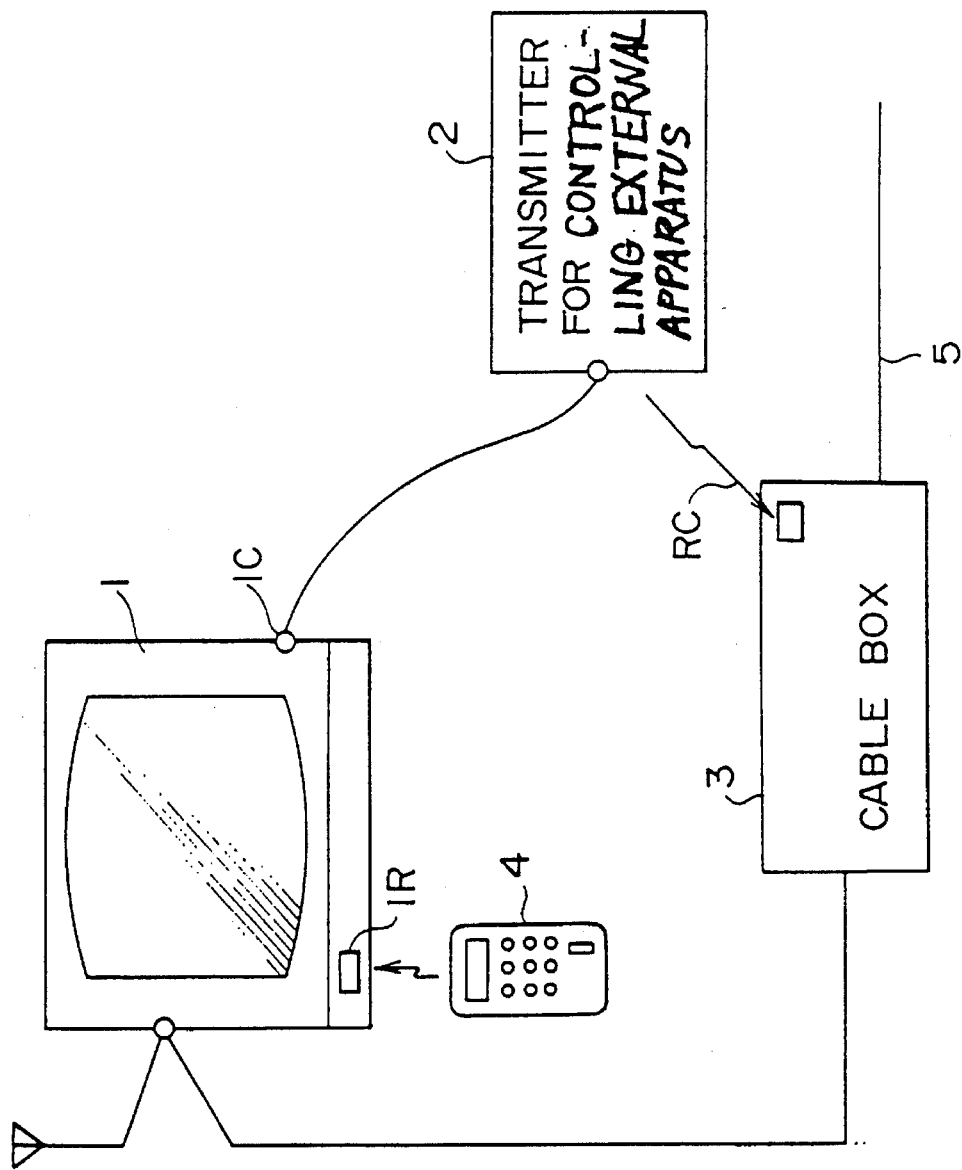

VIDEO SIGNAL RECEIVING SYSTEM WITH SIGNAL SOURCE SWITCHING BASED ON GENERATED CONTROL SIGNALS

BACKGROUND OF THE INVENTION

The present invention relates to a video signal receiving apparatus including a television receiver having a receiving mode for cable television, for example. The present invention also relates to a video signal receiving system containing the above-mentioned video signal receiving apparatus.

A cable television (CATV) system is known that retransmits television and FM broadcasting programs in VHF and UHF broadcasting frequency bands and transmits local community broadcast, satellite broadcast, and other television broadcast programs in the midband and super highband of the frequency band to distribute the programs to many subscribers through transmission media such as coaxial cables.

A receiving apparatus and a sending apparatus for television broadcasting and satellite broadcasting are closely arranged at a center station (or a head end) of the CATV system by which many channels of television signals sent at suitable levels are distributed to the subscribers through a relay transmission path called a trunk system and a distribution system with a distributing apparatus (or a tap-off) composed of a passive element connected with an output of a high-power amplifier.

As mentioned above, since multi-channel signals are transmitted in the CATV system, an ordinary television receiver cannot receive all the channels. Therefore, each of the subscribers is supplied with a receiving terminal (or a cable box) having a tuner capable of receiving multiple channels according to a contract concluded with a CATV broadcasting company on a lease or buy basis. Using this cable box, each subscriber receives television signals of desired CATV channels.

In this case, a television signal received and tuned in with the cable box is converted by an RF converter into a broadcast wave of an idle channel of the television receiver, the resultant broadcast wave being supplied to an antenna input terminal of the television receiver. The audience can tune in the idle channel of the television receiver to view the CATV broadcast.

In a case where the cable box has output terminals for a demodulated video signal and a demodulated sound signal obtained from the received and tuned in television signal and the television receiver has input terminals for the video and sound signals, the output terminals of the cable box are connected to the input terminals of the television receiver. In that case, an input selector of the television receiver is put in a state for selecting the input terminals, allowing the audience to view the CATV broadcast.

It should be noted that, in CATV, pay broadcast programs such as pay television and pay per view are scrambled to prevent free viewing, so that the above-mentioned cable box is provided with a descrambler.

In addition, it is a general practice with recent television receivers that user input operations for operational control such as channel selection and input selector selection are performed on a remotely controlled operator unit (hereinafter referred to as a remote commander) to send a remote control signal from the remote commander to a remote control signal receiving portion of the television receiver in a wireless manner using an infrared ray or other means.

Likewise, the cable box also has a remote control signal receiving portion in many cases. In this case, channel selection, for example, is performed by means of a remotely controlled tuning control signal sent from the remote commander in a wireless manner.

Thus, the cable box can be remotely controlled by a remote commander as with the television receiver. Therefore, if operations such as channel tuning control can be performed at the cable box by means of a remote commander for the television receiver, the remote commander can be shared by both the cable box and the television receiver to construct a video signal receiving system having a remote control system that is extremely easy to use.

However, generally the manufacturers of the cable box and the television receiver are different, so that the remote control signal for the cable box is different from the remote control signal of the television receiver in format, thereby making it impossible to use the same remote commander for the television receiver as the cable box.

To solve this problem, a system is proposed in which an output terminal 1c for the remote control signal is provided on a television receiver 1 as shown in FIG. 16, the output terminal 1c being connected to a transmitter 2 for controlling external apparatus to transmit a remote control signal RC for a cable box 3 from the transmitter 2 to the cable box 3 in a wireless manner.

That is, referring to FIG. 17, in the television receiver 1, a remote control signal received by a remote control signal coming from a remote commander 4 and received portion 1R is decoded by a control microcomputer 1M. Based on the decoding result, a control signal is supplied to each portion of the television receiver 1. The remote control signal coming from the remote commander 4 and received by the remote control signal receiver 1R is output to a remote control signal output terminal 1c directly. It should be noted that the remote control signal receiver 1R shapes the remote control signal coming from the remote commander 4 before reproducing an original remote control signal waveform.

The transmitter 2 for controlling external apparatus decodes the remote control signal coming from the output terminal 1c by means of a decoder 2D, then converts the decoded control signal to a remote control signal for the cable box by means of a converter 2H, and transmits the converted control signal to a remote control signal receiver 3R of the cable box 3 in a wireless manner.

In the receiving system thus constituted, it is possible, by means of the remote commander 4, to select, in the cable box 3, a television signal of one of multiple channels coming via a CATV cable 5.

However, as mentioned above, since the television receiver used in the conventional video signal receiving system has a constitution in which the remote control signal coming from the remote commander 4 is output to the output terminal 1c without change to be sent to the transmitter 2 for controlling external apparatus, the cable box 3 is supplied only with a key signal directly corresponding to each operator button on the remote commander; for example, if a numeric key is operated, a key signal that indicates the operation is supplied to the cable box.

Consequently, it has been impossible to implement composite channel operating capabilities using the control microcomputer 1M unless the capability is provided on the cable box.

That is, a predetermined channel corresponding to a predetermined number is preset in memory by a user as a channel to be frequently viewed for example, and the preset channel is put in a read mode. Then, when the corresponding number is entered from a numeric key, the desired predetermined channel can be selected.. However, with a cable box not having such a capability, a key input on the remote commander for setting the mode for reading the preset channel is ignored and only a subsequent numeric key input is made valid, thereby selecting a channel corresponding the subsequent key operation.

OBJECTS AND SUMMARY OF THE INVENTION

It is therefore an object of the present invention to provide a video signal receiving apparatus such as a television receiver for implementing the above-mentioned composite channel operating capabilities on the video signal receiving apparatus even if the video signal receiving apparatus such as a cable box does not provide the above-mentioned composite channel operating capabilities and provide a video signal receiving system containing the above-mentioned video signal receiving apparatus.

In carrying out the invention and according to one aspect thereof, there is provided a video signal receiving apparatus which comprises a tuner for selecting a video signal of one channel of video signals of a plurality of channels coming from a receiving antenna; a control signal generator for generating a first control signal in response to an operation by a user; an operation controller for generating a second control signal from the first control signal coming from the control signal generator; a control signal selector for selecting one of the first control signal and the second control signal; a control signal output means for supplying one of the first and second control signals coming from the control signal selector to an external apparatus having a tuner for selecting a video signal of one channel; and a first receive mode for selectively receiving the video signal of one channel of the video signals of the plurality of channels received at the receiving antenna and a second receive mode for receiving a video signal coming from the external apparatus instead of the video signal coming from the antenna; wherein, in the second receive mode, if the first control signal is a predetermined signal, the operation controller switches the control signal selector from a state in which the first control signal is selected to a state in which the second control signal is selected in order to transmit one of the first control signal and the second control signal coming from the control signal output means to the externals apparatus.

According to the invention, the second video signal receiver or a television receiver for example, is provided with the first receive mode in which a television signal is received from the receive antenna and the second receive mode in which a video signal is received from the first video signal receiver, or a cable box for example.

When, in a state in which the second mode is selected in the television receiver by instruction from the control signal generator of the television receiver, or remote commander for example, a CATV broadcast channel is selected directly from the remote commander, the control signal selector of the television receiver is put by the operation controller into a state in which a remote control signal (a first remote control signal) coming from the remote commander is selected, the first remote control signal being sent to the transmitter for controlling external apparatus without change.

The transmitter for controlling external apparatus converts a format of the first remote control signal to a format suitable for the cable box and supplies the resultant signal to the cable box. Consequently, the cable box receives and selects a CATV channel as instructed.

Then, in a state in which the second receive mode is selected in the television receiver, if the above-mentioned composite operation is performed on the remote commander, the television receiver causes the control signal selector to select the second remote control signal .coming from the operation controller.

In this case, in the above-mentioned example, it is supposed that a predetermined CATV channel be stored in memory and an operation be made on the remote commander to issue a remote control signal for reading the predetermined CATV channel, by way of example. First, the operation controller decodes a command of composite channel operating capabilities coming from the remote commander as the first remote control signal and waits for a signal for reading the CATV channel from memory. When the signal for reading the CATV channel comes from the remote commander as the first remote control signal, the operation controller outputs a signal for indicating the read CATV channel as the second remote control signal. Therefore, the transmitter for controlling external apparatus is supplied with this second remote control signal.

The second remote control signal is the same as the remote control signal directly coming from the remote commander as the first remote control signal for indicating the above-mentioned read CATV channel. The transmitter for controlling external apparatus converts a format of this second remote control signal to a format suitable for the cable box and supplies the resultant signal to the cable box. Consequently, the cable box receives and selects the CATV channel as instructed by the remote commander in a composite manner.

The above and other objects, features and advantages of the present invention will become more apparent from the accompanying drawings, in which like reference numerals are used to identify the same or similar parts in several views.

BRIEF DESCRIPTION OF DRAWINGS

FIG. 2 is a diagram illustrating a display screen of a television receiver for the purpose of describing composite control capabilities;

FIG. 3 is a diagram illustrating another display screen for the same purpose;

FIGS. 5, 5A and 5B are a part of a flowchart for describing operations of a main portion of the embodiment of FIG. 1;

FIGS. 14(A) and 14(B) are diagrams illustrating examples of arrangement of components constituting the receiving system according to the invention;

FIG. 16 is a schematic diagram illustrating the components constituting the receiving system according to the invention.

DESCRIPTION OF THE PREFERRED EMBODIMENTS

This invention will be described in further detail by using a television receiver by way of example as one preferred embodiment of a video signal receiving apparatus and a receiving system using the television receiver according to the invention, with reference to the accompanying drawings.

Figure 1:
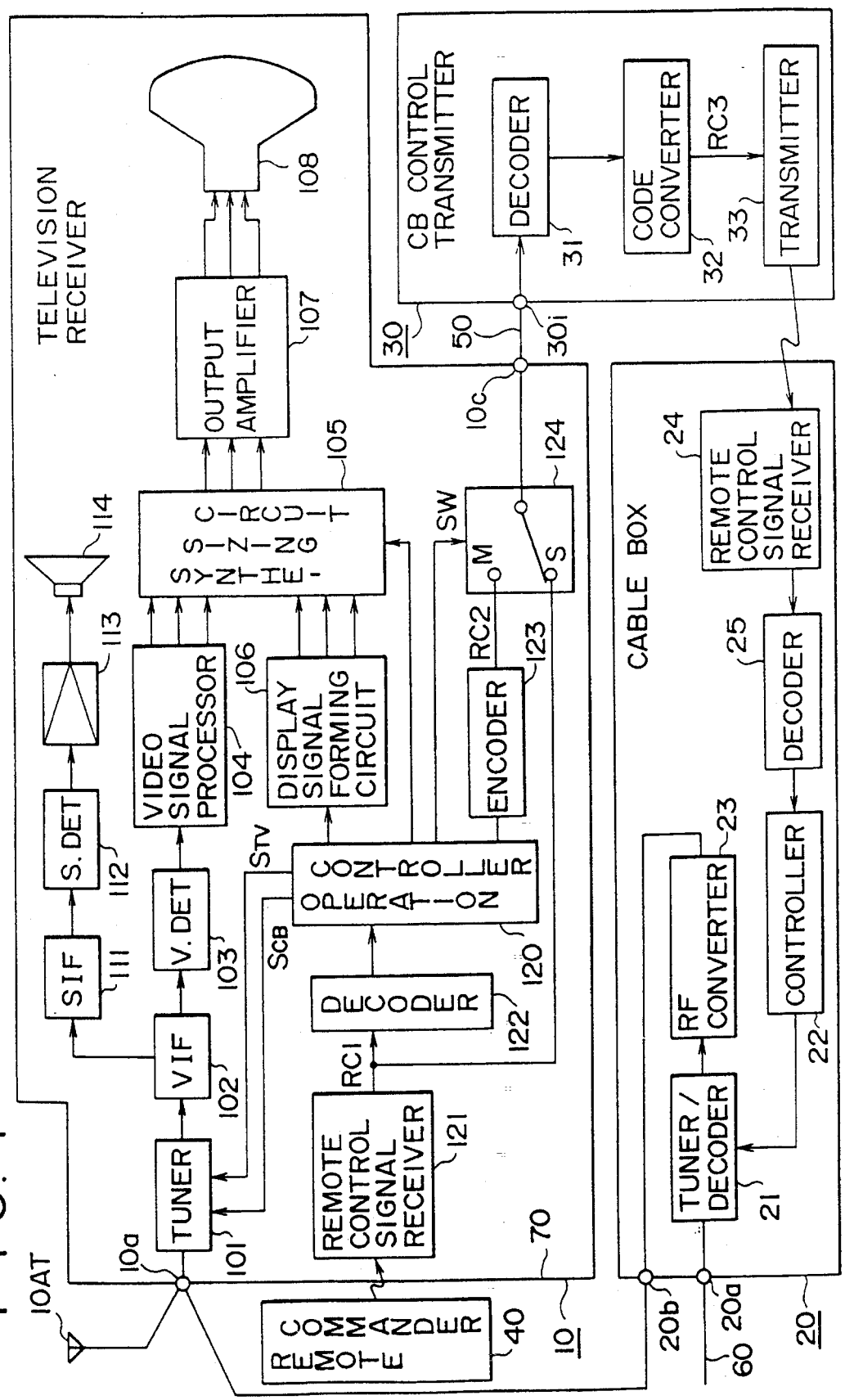
FIG. 1 is a block diagram illustrating a video signal receiving system practiced as one preferred embodiment of the invention.

Referring to FIG. 1, there is shown a block diagram illustrating the video signal receiving system practiced as one preferred embodiment of the invention. In the figure, reference numeral 10 indicates the television receiver of the above-mentioned example. Reference numeral 20 indicates a cable box as an example of a first video signal receiver constituting the video signal receiving system. Reference numeral 30 indicates a-transmitter for cable box control (hereinafter referred to as a CB control transmitter) as an example of a transmitter for controlling external apparatus constituting the receiving system. Reference numeral 40 indicates a remote commander for the television receiver, the remote commander using an infrared ray for example.

The above-mentioned television receiver 10, cable box 20, and CB control transmitter 30 are interconnected in the same manner as shown in FIG. 16. In the above-mentioned example, a television signal of a CATV channel received and selected by the cable box 20 is converted to a broadcast wave signal of a predetermined idle channel, for example, channel 2, to be supplied to an antenna input terminal 10a of the television receiver 10. The television receiver 10 also has a control signal output terminal 10c connected to an input terminal 30I of the CB control transmitter 30 through a control signal transmission cable 50.

In the television receiver 10, broadcast waves of a plurality of channels received by a receiving antenna 10 AT are supplied to a tuner 101 through the antenna input terminal 10a. In the tuner 101, one of the television signals of the plurality of channels is selected by a tuning control signal supplied from an operation controller, as will be described, and the selected television signal is converted to a video intermediate frequency signal.

The video intermediate frequency signal coming from the tuner 101 is amplified by a video intermediate frequency amplifier (VIF) 102. The resultant signal is supplied to a video signal detector (VDET) 103 to be demodulated, thereby providing a color video signal. The color video signal coming from the detector 103 is then supplied to a video signal processor 104.

In the video signal processor 104, a luminance signal component and a color signal component are separated from the color video signal, various processing operations are performed on the separated luminance and color signal components, and matrixing is performed on the processed luminance and color signal components to form three primary color signals R (red), G (green), and B (blue) . These three primary color signals are supplied to a synthesizing circuit 105 for performing processing such as so-called superimposition.

Reference numeral 106 indicates a display signal forming circuit for forming a display signal for displaying an image formed by synthesizing characters, symbols, and graphics by superimposition or like processing. The display signal forming circuit 106 captures a display control signal coming from an operation controller 120 composed of a microcomputer for example, and outputs three primary color display signals Rn, Gn, and Bn for performing image display according to the display control signal, supplying the three primary color display signals to the synthesizing circuit 105.

In the synthesizing circuit 105, one group of three primary color signals, namely, the R, G, B coming from the video signal processor 104 and the Rn, Gn, Bn coming from the display signal forming circuit 106, is selectively taken out according to a synthesis control signal coming from the operation controller 120. Alternatively, three primary color signals obtained by synthesizing the two groups of three primary color signals are taken out.

The three primary color signals output from the synthesizing circuit 105 are supplied to a color cathode ray tube (CRT) 108 through an output amplifier 107. On the CRT 108, an image corresponding to the three primary color signals coming from the video signal processor 104 is reproduced, an image corresponding to the three primary color signals Rn, Gn, Bn coming from the display signal forming circuit 106 is reproduced, or a synthetic image obtained by superimposing the image corresponding to the Rn, Gn, Bn signals on the image corresponding to the R, G, B signals is reproduced.

From the video intermediate frequency amplifier 102, a sound intermediate frequency signal separated from the video intermediate frequency signal is also obtained. The sound intermediate frequency signal is amplified by a sound intermediate frequency amplifier 111 and the resultant signal is supplied to a sound signal detector 112 to be demodulated. Then, the demodulated sound signal is supplied to a speaker through a sound signal amplifier 113 to be reproduced.

Reference numeral 121 indicates a remote control signal receiver to receive a wireless transmission from the remote commander 40 by infrared radiation. The remote control signal receiver 121 shapes a remote control signal having a format called SIRCS (Sony Infrared Remote Control System) coming from the remote commander 40 to reproduce its original waveform. A remote control signal RC1 output from the remote control signal receiver 121 is decoded by a decoder 122 to be supplied to the operation controller 120. The operation controller 120 forms a control signal according to a user operation on the remote commander 40 and outputs the control signal to a portion corresponding to a key operation on the remote commander.

The remote control signal RC1 coming from the remote control signal receiver 121 is also supplied to a switch circuit 124 at one input terminal S. At the same time, the control signal coming from the operation controller 120 is supplied to an encoder 123 to be encoded to the format (SIRCS) of the remote control signal coming from the remote commander 40. The encoded signal RC2 is then supplied to the switch circuit 124 at another input terminal M.

A switch signal SW of the switch circuit 124 is generated in the operation controller 120 and is supplied to the switch circuit 124. As will be described, if the switch circuit 124 is in a mode in which the television receiver 10 receives the television signal coming from the cable box 20 and if the remote control signal RC1 from the remote commander indicates composite channel operation capabilities set on the television receiver 10, the switch signal SW causes the switch circuit 124 to switch to the input terminal M to take out the remote control signal RC2 coming from the encoder 123; otherwise, the switch signal SW causes the switch circuit 124 to switch to the input terminal S to take out the remote control signal RC1 coming from the remote control signal receiver 121.

The remote control signal RC1 or RC2 is supplied to a control signal output terminal 10c. The control signal output terminal 10c is connected to an input terminal 30i of the CB control transmitter 30 through a control signal transmission cable 50. The CB control transmitter 30 decodes, by means of a decoder 31, the remote control signal entered at the input terminal 30i. The decoded signal is supplied to a code converter 32 to be converted to a format suitable for the cable box 20. The code converter 32 has conversion tables containing remote control signals consisting of codes having formats of cable box manufacturers and original control signals obtained by decoding the remote control signals. When constructing the receiving system of the current embodiment for example, a user or salesperson specifies a manufacturer of the cable box to select a corresponding conversion table to be used in the code converter 32.

A remote control signal RC3 obtained from the code converter 32 is supplied to an infrared transmitter 33 in the current embodiment to be transmitted to a remote control signal receiver 24 of the cable box 20 in a wireless manner.

A terminal 20a of the cable box 20 is connected to a CATV cable 60 to input a cable broadcast signal into the cable box 20. The cable broadcast signal entered at the terminal 20a is supplied to a tuner/decoder 21. The tuner/decoder 21 has a descrambler to descramble a pay program and selects, based on a tuning control signal coming from a controller 22, a CATV broadcast signal of a desired channel selected by user on the remote commander 40. The selected signal is demodulated by the tuner/decoder 21 into a video signal and a sound signal.

The video signal and the sound signal are supplied from the tuner/decoder 21 to an RF converter 23 to be converted to three channels of broadcast wave signals of the television in the current embodiment. The converted signals are transmitted from an output terminal 20b to an antenna input terminal 10a of the television receiver 10 through a cable 70.

In the cable box 20, the remote control signal RC3 received by the remote control signal receiver 24 is also decoded by a decoder 25 to, be supplied to the controller 22. The controller 22 generates a channel tuning control signal corresponding to the remote control signal RC3 to supply the generated signal to the tuner/decoder 21 and supplies a predetermined control signal to the RF converter 23.

The television receiver 10 in the current embodiment provides a television receive mode for TV reception through the antenna 10 AT and a cable box receive mode for receiving CATV broadcast signals from the cable box 20. The remote commander, as will be described, has a key for switching between the two receive modes. When the television receive mode is selected by this receive mode switch key, a channel select control signal STV for selecting a channel corresponding to a key input operation performed on the remote commander 40 is obtained from the operation controller 120 in the television receiver 10. The obtained signal STV is sent to the tuner 101, which tunes in to a broadcast channel corresponding to the channel selection.

When the cable box receive mode is selected by the receive mode switch key, a channel select control signal SCB for selecting two channels of broadcast waves, that signal coming from the cable box 20 exclusively through the tuner 101, is obtained from the operation controller 120 in the television receiver 10. The obtained SCB is supplied to the tuner 101. Therefore, in the television receiver 10, the tuner 101 is fixed to a state in which the television signal coming from the cable box 20 is always selected.

The composite channel operation capabilities set to the television receiver 10 include, in the current embodiment, a channel guide capability and a channel jump capability.

The channel guide capability allows a user to relate broadcast channels and their station names with numbers "1", "2", "3" and so on for example, one by one in advance and store the relationship in memory of the operation controller 120. The stored relationship is displayed on a screen as shown in FIG. 2 or FIG. 3 (this screen is called a channel guide menu screen). In this screen, a desired broadcasting station can be selected by entering a corresponding number or selecting the station with a cursor or the like.

The channel guide capability can be used in both the television receive mode and the cable box receive mode. Broadcasting stations to be stored by the user for the channel guide capability are those which can be received via the antenna 10 AT in the television receive mode. In the cable box receive mode, CATV stations that can be received by the cable box are stored. In each case, the stations are stored in the memory contained in the operation controller 120.

The menu screen of FIG. 2 of FIG. 3 is displayed in each receive mode by pressing a channel guide key button on the remote commander. Contents of the display screen are those entered according to each receive mode.

In the case of the menu screen of FIG. 2, entered broadcast station names are displayed in correspondence with numbers "1", "2", "3" and so on. If broadcasting station "ABC" for example, is to be tuned in, the user presses numeric key "1" on the remote commander. A remote control signal corresponding to number "1" is generated and transmitted from the remote commander to the operation controller 120 through the remote control signal receiver 121 and the decoder 122. Based on the received remote control signal, the operation controller 120 generates the channel select control signal for the broadcasting station "ABC" stored at number "1".

In the television receive mode, the channel select control signal is sent to the tuner 101 to select the desired broadcasting station. In the cable box receive mode, the channel select control signal is encoded by the encoder 123 to be supplied to the 10c via the switch circuit 124. Therefore, in the cable box 20, the desired CATV broadcast channel is tuned in.

Use of the channel guide capability allows the user to easily select any desired station from the menu displayed on the screen without entering a number corresponding to the desired station from the remote commander 40.

In the example of the menu screen of FIG. 3, a predetermined up-down rocker key on the remote commander can be operated to position a triangular cursor marker to a desired broadcasting station shown in FIG. 3. Then, pressing a setting key or an Enter key selects the broadcasting station indicated by the cursor.

In addition, the channel jump capability allows the user to reselect a channel selected immediately before as a received channel, upon pressing a channel jump key button on the remote commander.

For the channel jump capability, information about the channel received immediately before is always stored in the memory of the operation controller 120. For channel-up or channel-down information, a corresponding channel-up signal or channel-down signal is stored. In the cable box receive mode, this information about the received channel is information not about a channel to be selected by the tuner 101 but about a CATV channel entered from the remote commander 40.

Figure 4:
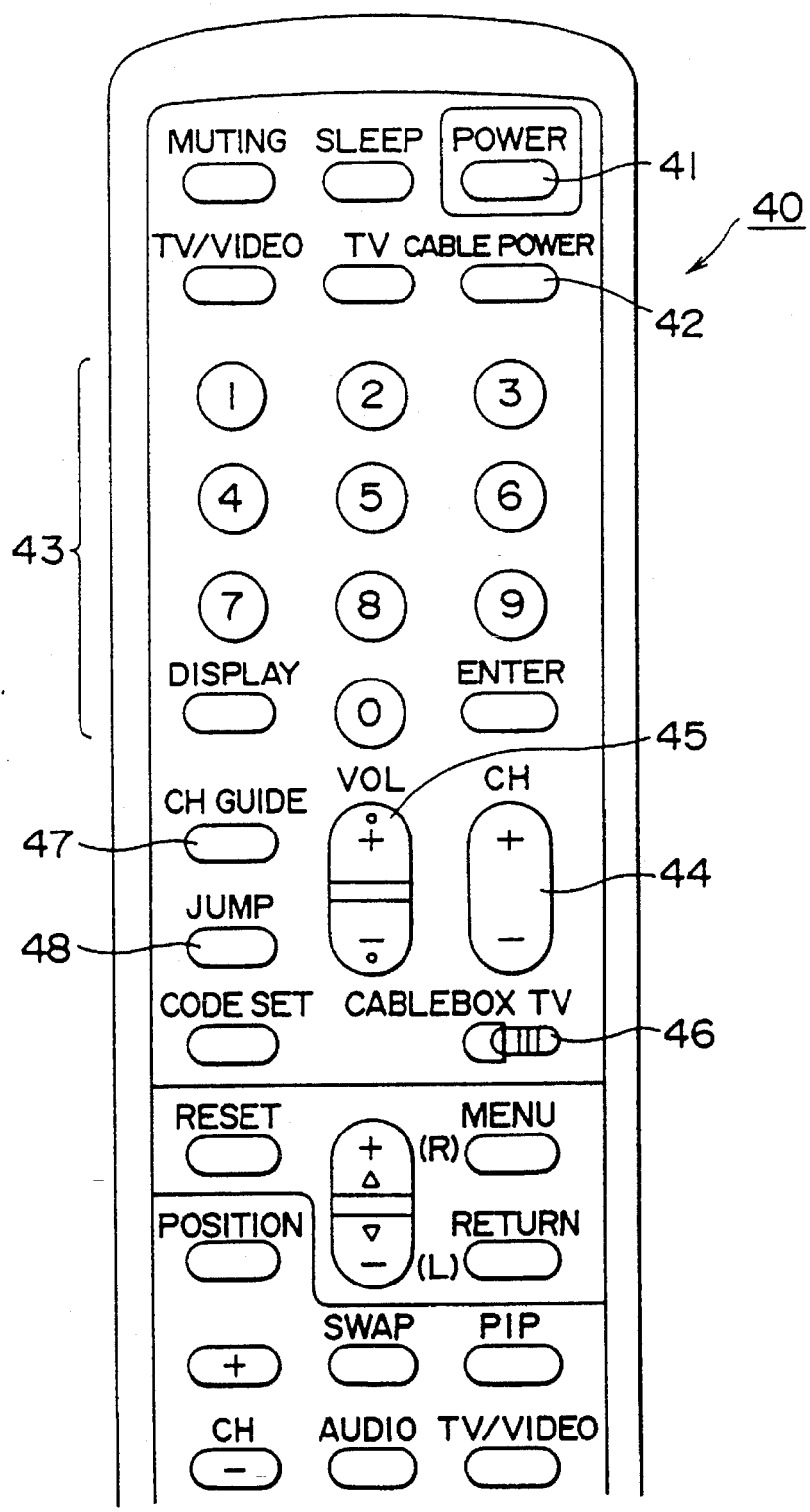
FIG. 4 is a fragmentary view of key buttons of a remote commander for use on the embodiment of FIG. 1.

Referring to FIG. 4, there is shown a part of a layout of operator keys provided on the remote commander 40 of the current embodiment. As shown, the remote commander 40 has two power keys: a power key 41 for the television receiver 10 and a power key 42 for the cable box. In addition, like a conventional remote commander, the remote commander 40 has a numeric key group 43 consisting of "0" through "9", a rocker key 44 for channel selection, a rocker key 45 for volume adjustment, a switch key 46 for switching between television receive mode and cable box receive mode, a channel guide key 47, and a channel jump key 48.

As described above, the television receive mode or the cable box receive mode is selected by the receive mode switch key 46. When the channel guide key 47 is pressed, the television receiver 10 is put in channel guide mode. When the channel jump key 48 is pressed, the television receiver 10 is put in channel jump mode.

These states of the television receiver 10 are controlled by the operation controller 120 as mentioned above. In the current embodiment, the remote control signals RC1 and RC2 are each attached with a category code according to a receive mode set by the receive mode switch key 46, the category code identifying which of the television receiver and the cable box the remote control signal belongs to.

Figure 6:
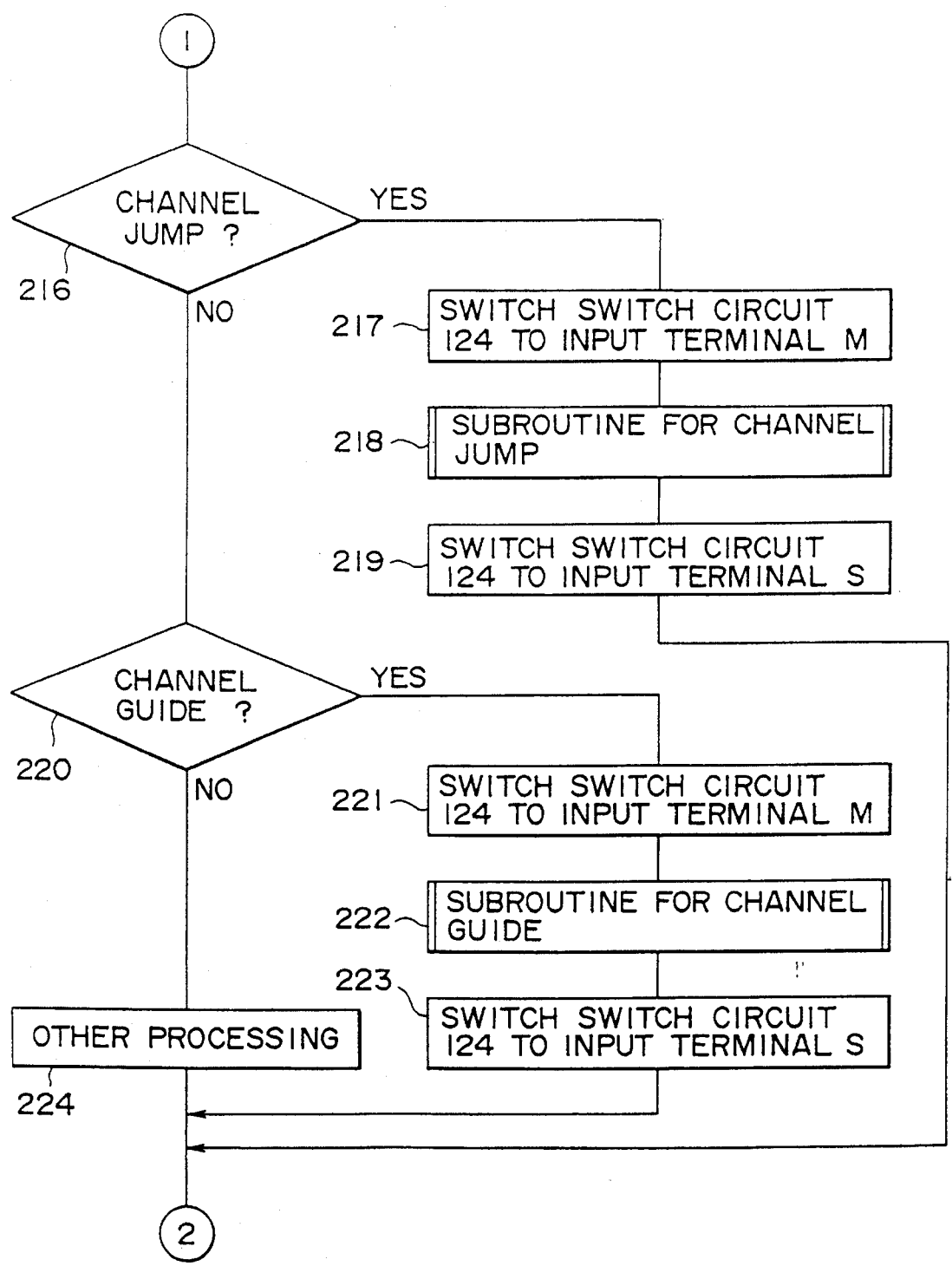
FIG. 6 is another part of the flowchart of FIG. 5.

FIG. 5 and FIG. 6 respectively show parts of a flowchart for a main processing routine of the operation controller 120. First, the operation controller 120 awaits entry of the remote control signal RC1 (step 201). When the remote control signal RC1 comes, the operation controller determines whether the remote control signal RC1 is for mode switching (step 202). If the remote control signal RC1 found not to be for mode switching, the operation controller performs processing according to the remote control signal RC1 (step 203). Before the processing, the operation controller checks the above-mentioned category code of the remote control signal RC1 to find which receive mode the RC1 is for. The processing is performed in the confirmed receive mode. When the processing has been completed, the operation controller goes back to step 201 to wait for the entry of a next remote control signal RC1.

If the entered remote control signal RC1 is for mode switching, the operation controller determines whether the switching is to the television receive mode (step 204). If the switching is found to be for the television receive mode, the operation controller puts the television receiver 10 in the television receive mode (step 205) and then returns to step 201 to wait for entry of a next remote control signal RC1.

In the television receive mode, the switch circuit 124 is kept by the operation controller 120 in a state in which the switch circuit is always set to input terminal S side. Consequently, the remote control signal coming from the remote control signal receiver 121 is supplied through the CB control transmitter 30 to the cable box 20 as the remote control signal RC3 without change. Since, in the television receive mode, the category code for indicating the television receiver is attached, this remote control signal RC3 is ignored in the controller 22 of the cable box 20.

If the remote control signal RC1 is found in step 204 not to be for the television receive mode, the operation controller regards it to be for the cable box receive mode (step 206) and goes to step 207 to await entry of a next remote control signal RC1.

In the cable box receive mode, the operation controller 120 puts the tuner 101 in a state in which the tuner always receives two channels and, at the same time, the operation controller generally keeps the switch circuit 124 set to the input terminal S.

Then, as will be described, in the above-mentioned state, the operation controller 120 checks the remote control signal RC1 attached with the category code coming from the remote commander 40 and indicating the cable box. If the remote control signal RC1 is found to be for neither the channel jump nor the channel guide, the operation controller controls the cable box 20 with the remote control signal RC1 put in a state in which it is supplied to the cable box 20 without change through the CB control transmitter 30. If the remote control signal RC1 is found to be for the channel jump or the channel guide, the operation controller switches the switch circuit 124 to the input terminal M and controls the cable box 20 with the remote control signal RC2 generated by the operation controller and encoded by the encoder 123 put in a state in which it is supplied to the cable box 20 through the CB control transmitter 30.

That is, if, in the cable box receive mode, the operation controller detects entry of the remote control signal RC1 in step 207, the operation controller determines whether the RC1 is for mode switching (step 208). If the RC1 is found for mode switching, the operation controller puts the television receiver 10 in the television receive mode (step 205) and then goes back to step 201 to await entry of another remote control signal RC1.

If the RC1 is found not to be for mode switching in step 208, the operation controller determines whether the RC1 is for channel operation (step 210). If the RC1 is found not to be for channel operation, the operation controller performs processing according to the RC1 (step 211) and goes back to step 207 to await entry of another remote control signal RC1.

If, in step 210, the remote control signal RC1 is found to be for channel operation, the operation controller determines whether the channel operation is channel-up operation (step 212). If the channel operation is found to be for channel-up operation, the operation controller goes to step 213 to keep the switch circuit 124 held at the input terminal S and puts this remote control signal RC1, namely, a channel-up signal for selecting a channel immediately above a currently selected channel in frequency, into a state in which this signal is sent, without change, to the output terminal 10c through the input terminal S of the switch circuit 124. Then, the operation controller goes back to step 207 to await entry of a next remote control signal RC1.

At this moment, the remote control signal RC1 for channel-up operation is supplied to the CB control transmitter 30, decoded by the decoder 31, converted by the code converter 32 to a remote control signal RC3 suitable for the cable box 20, and transmitted to the cable box 20 through the infrared transmitter 33 in a wireless manner.

In the cable box 20, this remote control signal RC3 is received by the receiver 24, decoded by the decoder 25, and determined by the controller 22. The controller 22 outputs to the tuner/decoder 21 a channel select signal for selecting a channel immediately above a currently selected channel in frequency. This puts the cable box 20 in a state in which the cable box selects a CATV broadcast of the channel immediately above the currently selected channel in frequency.

If the entered remote control signal RC1 is found not to be for channel-up operation in step 212, the operation controller goes to step 214 to determine whether the RC1 is for channel-down operation. If the RC1 is found to be for channel-down operation, the operation. Controller goes to step 215 to keep the switch circuit 124 held at the input terminal S and put this remote control signal RC1, namely a channel-down signal for selecting a channel immediately below a currently selected channel in frequency, in a state in which the channel-down signal is output without change via the input terminal S of the switch circuit 124. Then, the operation controller returns to step 207 to await entry of a next remote control signal RC1.

At this moment, the remote control signal RC1 for channel-down operation is supplied to the CB control transmitter 30, decoded by the decoder 31, converted by the code converter 32 to a remote control signal RC3 suitable for the cable box 20, and transmitted to the cable box 20 through the infrared transmitter 33 in a wireless manner. In the cable box 20, this remote control signal RC3 is received by the receiver 24, decoded by the decoder: 25, and determined by the controller 22. Then, the controller 22 outputs to the tuner/decoder 21 a channel select signal for selecting the channel immediately below the currently selected channel in frequency. This puts the cable box 20 in a state in which the cable box 20 selects CATV broadcast of the channel immediately below the currently selected channel in frequency.

If the entered remote control signal RC1 is found in step 214 not to be for channel-down operation, the operation controller goes to step 216 to determine whether the RC1 is for channel jump operation. If the RC1 is found to be for channel jump operation, the operation controller goes to step 217 to switch the switch circuit 124 to the input terminal M and executes a channel jump subroutine (step 218).

Figure 7:
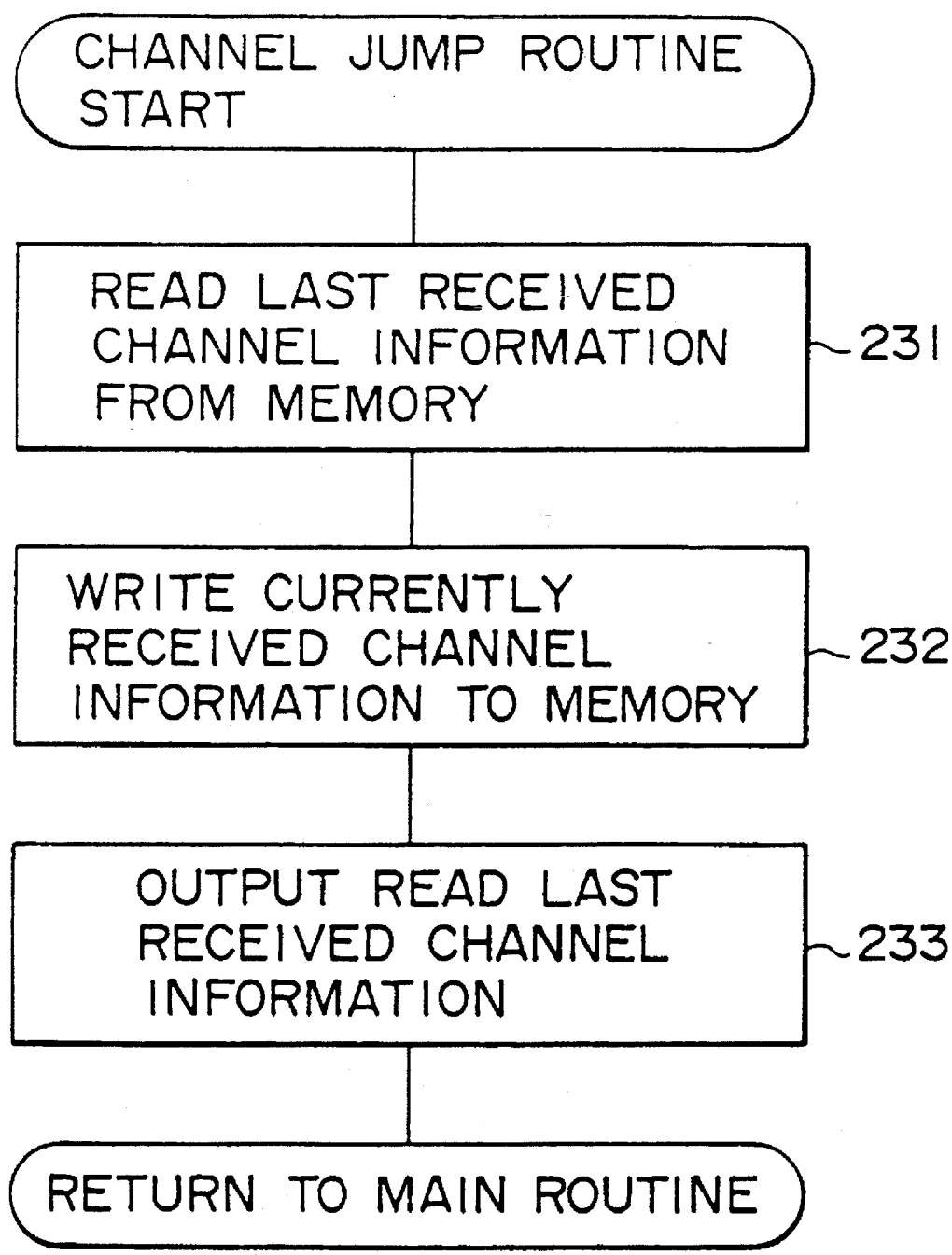
FIG. 7 is a flowchart for describing an example of an operation of composite channel selection control capabilities.

Referring to FIG. 7, there is shown a flowchart of an example of the channel jump subroutine. First, the operation controller 120 reads from its memory information about a CATV received channel selected immediately before a currently selected CATV received channel (step 231). Then, the operation controller writes information about the currently selected CATV received channel to the memory (step 232). Then, the operation controller outputs the read information about the channel selected immediately before (step 233). Finally, the operation controller returns to the main routine.

As a result of the execution of the channel jump subroutine, the above-mentioned information about the channel selected immediately before and output from the operation controller 120 is encoded by the encoder 123 to a remote controller signal RC2 to be supplied to the CB control transmitter 30 via the switch circuit 124 and the output terminal 10c.

In the CB control transmitter 30, this remote control signal RC2 is decoded by the decoder 31, converted by the code converter 32 to a remote control signal RC3 suitable for the cable box 20, and transmitted by the infrared transmitter 33 to the cable box 20 in a wireless manner. In the cable box 20, the RC3 is received by the receiver 24, decoded by the decoder 25, and determined by the controller 22. Then, the controller 22 supplies, to the tuner/decoder 21, a channel select control signal for selecting a CATV channel indicated by the RC3. Therefore, the receive and select state of the cable box 20 is switched to the receive and select state of the CATV channel received immediately before.

When the operation controller has returned to the main routine upon completion of the channel jump subroutine, the operation controller goes to step 219 to switch the switch circuit 124 to the input terminal S. Then, the operation controller goes back to step 207 to await entry of a next remote control signal RC1.

If the entered remote control signal RC1 is found in step 216 not to be for channel jump operation, the operation controller goes to step 220 to determine whether the RC1 is for channel guide operation. If the RC1 is found to be for channel guide operation, the operation controller goes to 221 to switch the switch circuit 124 to the input terminal M and executes a channel guide subroutine (step 222).

Figure 8:
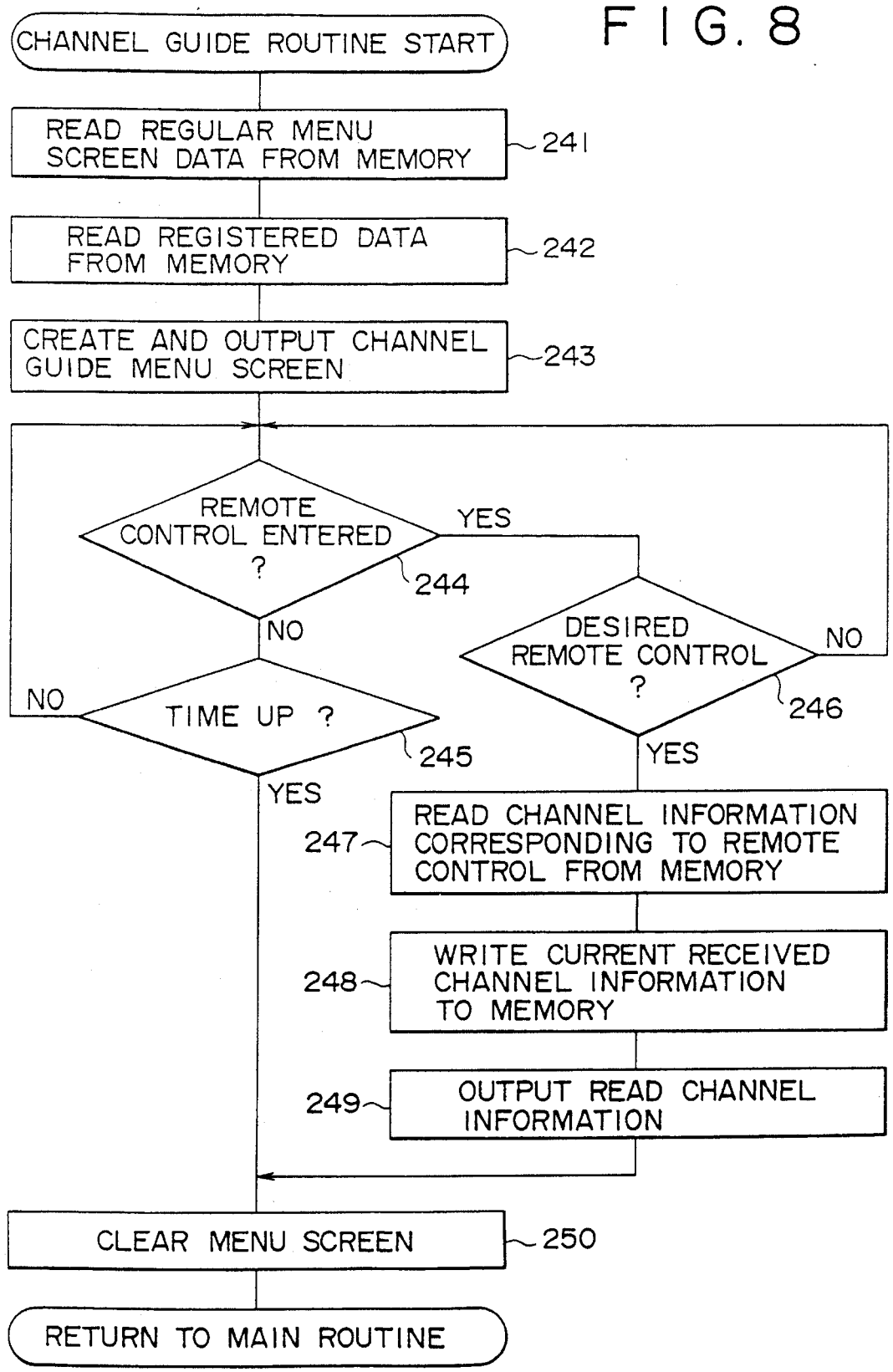
FIG. 8 is a flowchart for describing another example of the operation of FIG. 7.

Referring to FIG. 8, there is shown an example of a flowchart indicating an operation of the channel guide subroutine.

In FIG. 8, the operation controller 120 reads from its memory data of the regular menu screen for channel guide (step 241). Then, the operation controller reads data stored in its memory (step 242). Then, the operation controller creates a channel guide menu screen as shown in FIG. 2 or FIG. 3 from the regular menu screen read in step 241 and the data read in step 242 and displays the resultant screen on a color CRT 108 (step 243).

Then, the operation controller goes to step 244 to await entry of a next remote control signal RC1. If it is determined that no remote control signal RC1 has come after a predetermined period of time, the operation controller goes to step 250, clears the channel guide menu screen, and goes back to the main routine.

On the other hand, if the entry of the RC1 has been recognized in step 244, the operation controller goes to step 246 to determine whether this RC1 is for channel selection entered from the channel guide menu. If the RC1 is found not to be for channel operation entered from the channel guide menu, the operation controller goes back to step 244 to await entry of another remote control signal RC1.

If, in step 246, the entered remote control signal RC1 has been found to be for an operation expected by the channel guide, the operation controller goes to step 247 to read from its memory, CATV channel information corresponding to a broadcasting station specified by the RC1. Then, the operation controller goes to write the channel information it is currently receiving to a memory area in the memory built in the operation controller for the channel guide capability to be valid. Next, the operation controller goes to step 249 to output the CATV channel information read in step 247. Finally, the operation controller goes to step 250, clears the channel guide menu screen, and returns to the main routine. As a result of the execution of the channel guide subroutine, the received channel output from the operation controller 120 is encoded by the encoder 123 to a remote control signal RC2, which is supplied to the CB control transmitter via the switch circuit 124 and the output terminal 10c.

In the CB control transmitter, the remote control signal

RC2 is decoded by the decoder 31, converted by the code converter 32 to a remote control signal RC3 suitable for the cable box 20, and transmitted by the infrared transmitter 33 to the cable box in a wireless manner. In the cable box 20, the remote control signal RC 3 is received by the receiver 24, decoded by the decoder 25, and determined by the controller 22. The controller 22 supplies, to the tuner/decoder 21, a channel select control signal for selecting a CATV channel specified by the RC3. Therefore, the receive and select state of the cable box 20 is switched by the channel guide capability to the receive and select state of the CATV channel selectively entered from the screen of the television receiver 10.

When the operation controller has returned to the main routine upon completion of the channel jump subroutine, the operation controller then goes to step 219 to switch the switch circuit 124 to the input terminal S. Then, the operation controller goes back to step 207 to await entry of a next remote control signal RC1.

When the operation controller has returned to the main routine upon completion of the above-mentioned channel guide subroutine, the operation controller goes to step 224 to switch the switch circuit 124 to the input terminal S.

Thus, the composite channel operation capabilities including the channel jump and channel guide capabilities can be implemented also for the cable box 20 without adding changes or modifications to the cable box 20.

Figure 9:
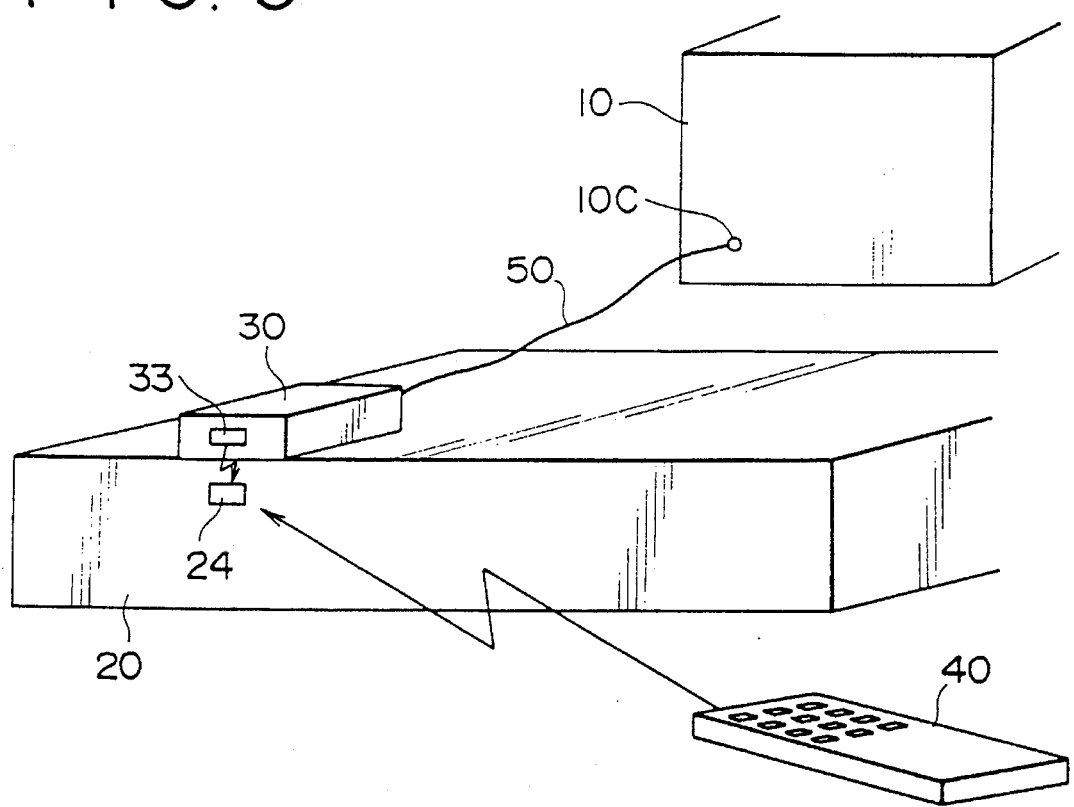
FIG. 9 is a perspective view illustrating an example of arrangement of components constituting the receiving system according to the invention.

In addition, construction of the receiving system of the above-mentioned embodiment requires that the CB control transmitter 30 be located near the cable box 20 as shown in FIG. 9 so that the control signal can be transmitted from the infrared transmitter 33 to the remote control signal receiver 24 of the cable box 20 in a wireless manner.

However, in the installation example of FIG. 9, the remote control signal receiver 24 of the cable box 20 is exposed outside the cable box, so that the remote control signal coming from the remote commander 40 can also be received by the receiver. Consequently, it is difficult to control the cable box 20 with stability only by means of the remote control signal RC3 coming from the CB control transmitter 30.

To solve such a problem, in the above-mentioned embodiment, a construction of a casing of the CB control transmitter 30 is suitably designed and an arrangement is made so that only the remote control signal RC3 coming from the CB control transmitter 30 is received by the remote control signal receiver 24.

Namely, in the above-mentioned embodiment, the casing of the CB control transmitter 30 is shaped like a character "L", the "L"-shaped transmitter being mounted on the cable box 20 so that a part of the transmitter covers the receiver 24.

Figure 10:
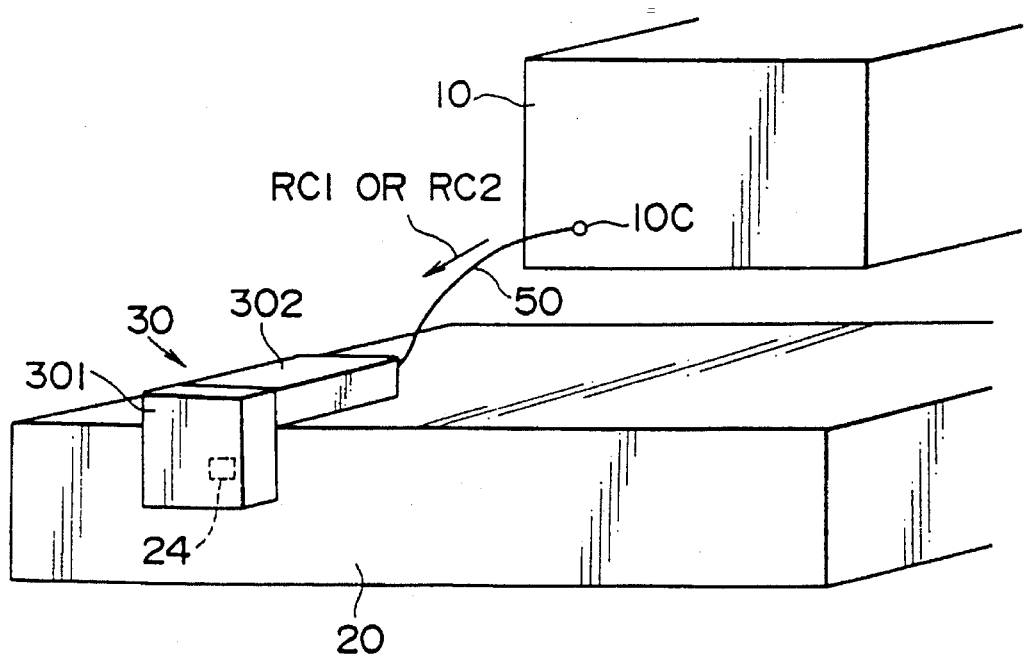
FIG. 10 is a perspective view illustrating another example of arrangement of FIG. 9.

Referring to FIG. 10, an example of the CB control transmitter 30 is mounted on the cable 20 wherein a generally square-shaped and vertically downward-going cover 301 of the transmitter 30 covers the remote control signal receiver 24 of the cable box 20. The cover 301 is connected to a generally rectangular, horizontally extending base 302.

The CB control transmitter has its gravity center in the base 302. This arrangement ensures stable installation of the CB control transmitter 30 on the cable box 20 when the base 302 is put on the cable box 20 so that the cover 301 covers the infrared receiver 24.

Figure 11:
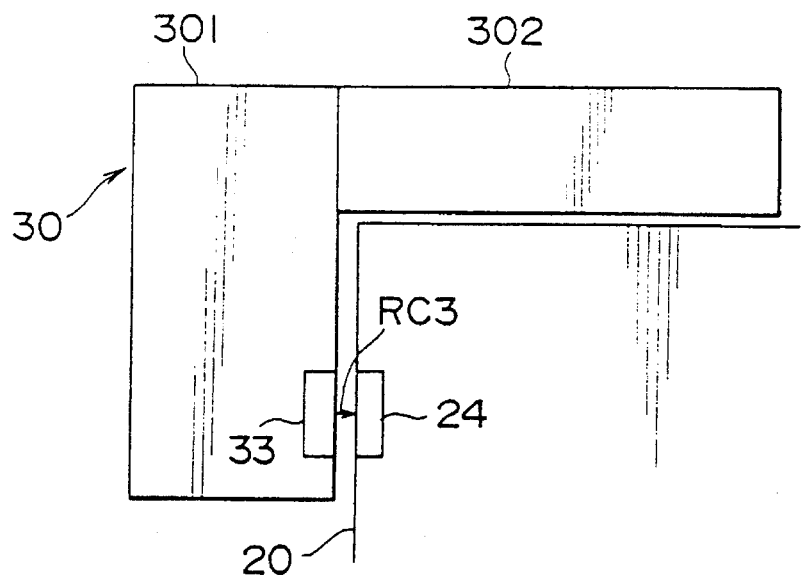
FIG. 11 is a diagram illustrating a relationship in arrangement between an example of a transmitter for controlling external apparatus of and a video signal receiver of the receiving system according to the invention.

Referring to FIG. 11, the infrared transmitter 33 is arranged at a lower portion inside the cover 301. This infrared transmitter 33 faces the receiver 24 with a relatively short space in between when the cover 301 is attached to the front of the receiver 24. In this arrangement, the infrared transmitter 33 transmits the control signal RC3 to the remote control receiver 24.

The cover 301 is composed of a member that absorbs or reflects infrared radiation. When the cover 301 is installed on the front of the remote control signal receiver 24 of the cable box 20, infrared control signals transmitted from other remote control apparatuses are prevented from being received by the receiver 24. This arrangement also prevents infrared radiation leaked from the infrared transmitter 33 inside the cover 301 from being leaked outside the cover 301.

According to the above-mentioned constitution, covering the remote control signal receiver 24 of the cable box 20 with the cover 301 of the CB control transmitter 30 prevents the remote control signals other than the RC3 transmitted by the infrared transmitter 33 of the CB control transmitter 30 from reaching the remote control receiver of the cable box 20 and ensures that the control signal RC2 reaches the infrared receiver 24, thereby providing stable control over the channel selection and other capabilities of the cable box 20 by means of the control signal RC3.

In the above-mentioned constitution, the infrared transmitter 33 of the CB control transmitter 30 is housed inside the cover 301 formed with the member absorbing or reflecting infrared radiation such that the infrared transmitter 33 faces the remote control signal 24 of the cable box 20 with a relatively short interval in between. Since the remote control signal RC3 does not actually reach equipment other than the cable box 20, there is virtually no possibility for the remote control signal RC3 to reach any other equipment to make them malfunction.

Figure 12:
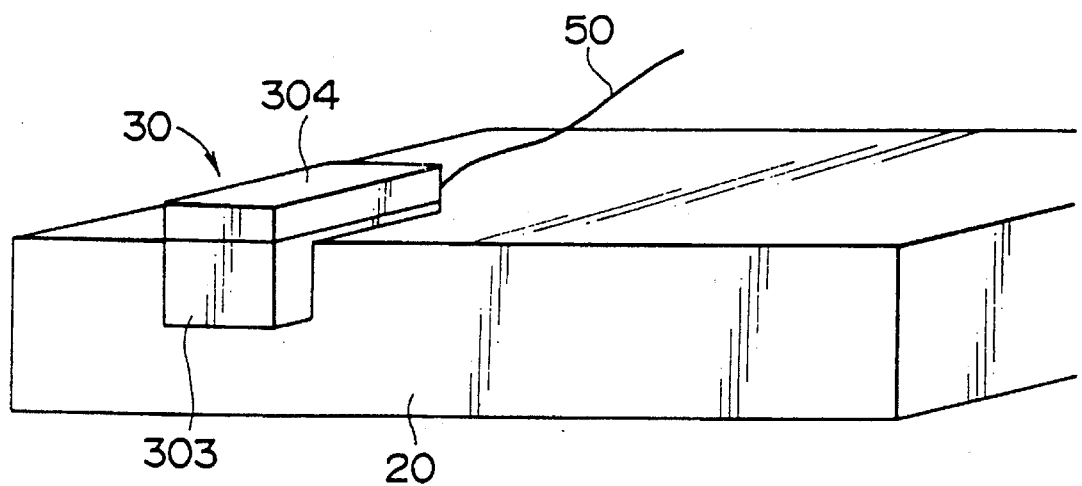
FIG. 12 is a diagram illustrating a relationship in arrangement between another example of the transmitter for controlling external apparatus and the video signal receiver of the receiving system according to the invention.

In the above-mentioned embodiment, the CB control transmitter 30 is composed of the cover 301 containing the remote control transmitter 33 and the base 302 connecting to the cover 301. It will be apparent, as shown in FIG. 12, that the CB control transmitter 30 may also be composed of an "L"-shaped cover 303 and a flat base 304 installed over the cover. In this case, the same effect as obtained by the above-mentioned constitution can be obtained.

In the above-mentioned embodiment, the infrared transmitter 33 is located at the lower portion of the cover 301 and the infrared transmitter 33 faces the remote control signal receiver 24 with the relatively short gap in between. It will be also apparent that the infrared transmitter 33 is located in one corner inside the cover and the remote control signal transmitted from the infrared transmitter is guided by reflection or through an optical guide tube to the remote control signal receiver 24.

Figure 13A:
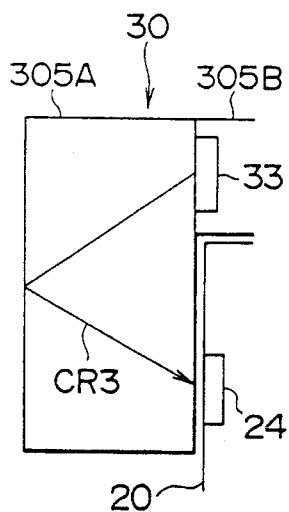
FIGS. 13(A) through 13(F) are diagrams illustrating relationships in arrangement between other examples of the transmitter for controlling external apparatus and the video signal receiver of the receiving system according to the invention.
Figure 13C:
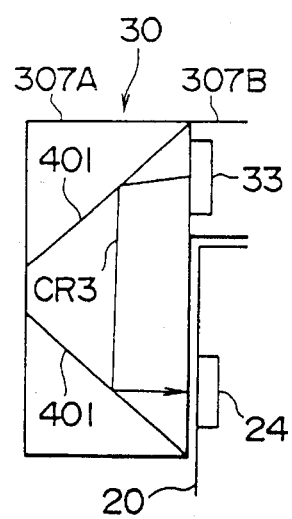
Figure 13E:
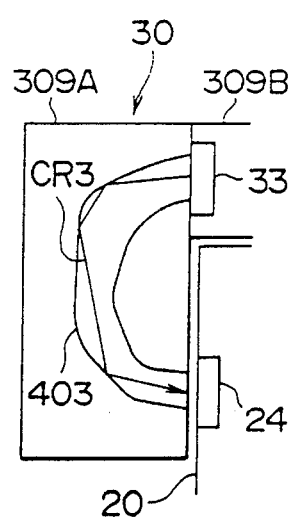
Figure 13B:
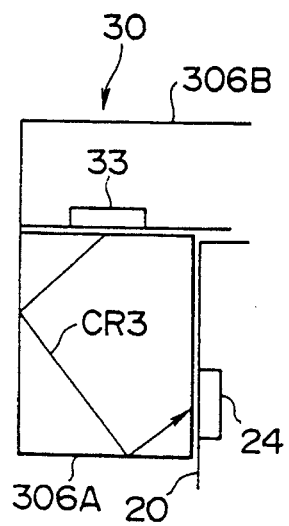

Further, as shown in FIGS. 13(A) and 13(B), it will be apparent that, covers 305A and 306A can be made hollow to make the control signal RC3 transmitted from the infrared transmitter 33 disposed on a base 305B and 306B be reflected from one or more inner walls of the covers to be guided to the remote control receiver 24.

Figure 13D:
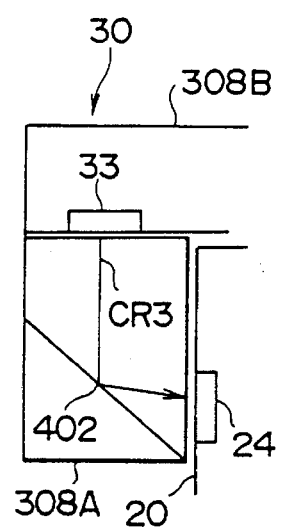

It will also be apparent, as shown in FIGS. 13(C) and 13(D), that a plurality of reflective members can be disposed inside a cover 307A or a single reflective member can be disposed inside a cover 308A to reflect the control signal RC3 to the remote control signal receiver 24.

Figure 13F:
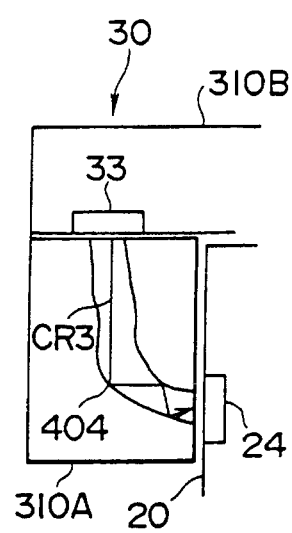

It will be still apparent, as shown in FIGS. 13(E) and 13(F), that the remote control signal RC3 can be guided to the remote control signal receiver 24 through an optical guide tube 403 disposed in a cover 309A and an optical guide tube 404 disposed in a cover 310A.

Although the CB control transmitter 30 has only capabilities for controlling the cable box 20 in the above-mentioned constitutions, it is apparent that the CB control transmitter may also have a display capability use in an exhibition or other purposes.

That is, as shown in FIGS. 14(A) and 14(B), when the CB control transmitter 30 is detached from the cable box 20 and placed on the cable box 20 or beside it with a cover 311A down, the top of a base 311B may be directed toward a user and the top may be labeled or decorated with a predetermined design.

Figure 15A:
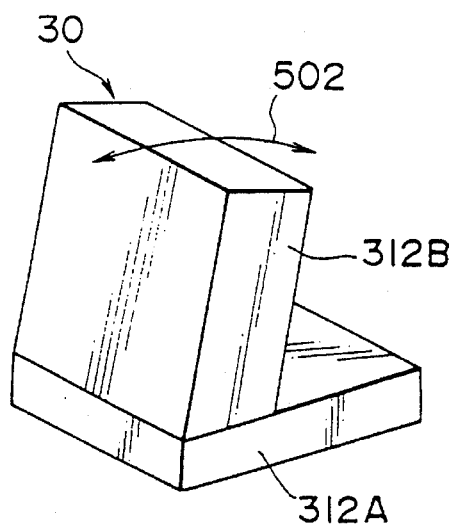
FIGS. 15(A) through 15(D) are diagrams illustrating other examples of the transmitter for controlling external apparatus.
Figure 15B:
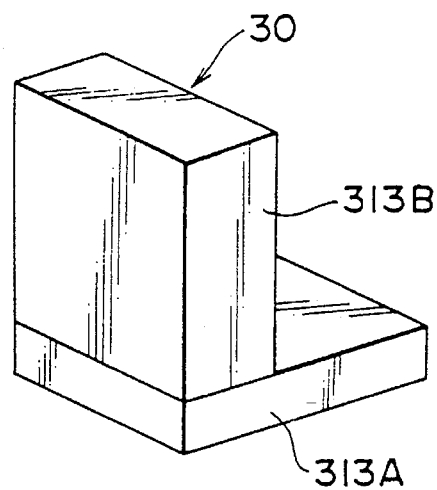

If the CB control transmitter 30 is placed with the cover 311B down, the gravity center of the transmitter 30 may be made, in various manners, to approach as close as possible to a vertical line passing a center of a support area on a front side of the cover 311A, thereby enhancing placing stability of the transmitter 30. For example, as shown in FIG. 15(A), a cover 312A and a base 312B may swing in arrow directions or, as shown in FIG. 15(B), a base 313B may be thickened in dimensions, thereby making the gravity center approach the vertical line as close as possible.

Figure 15C:
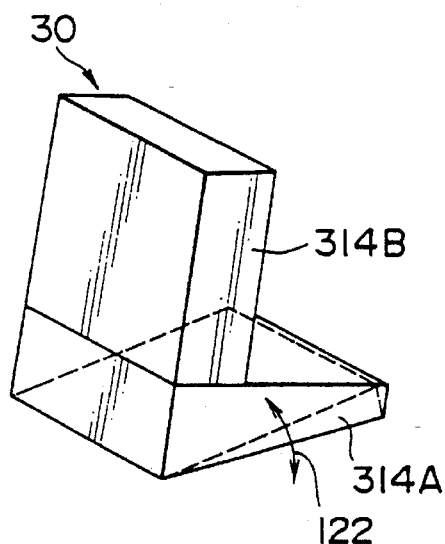
Figure 15D:
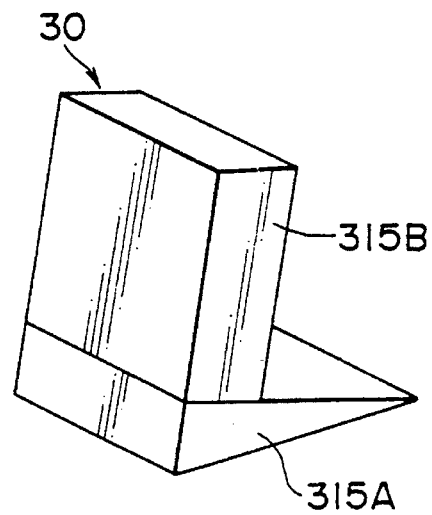
Figure 17:
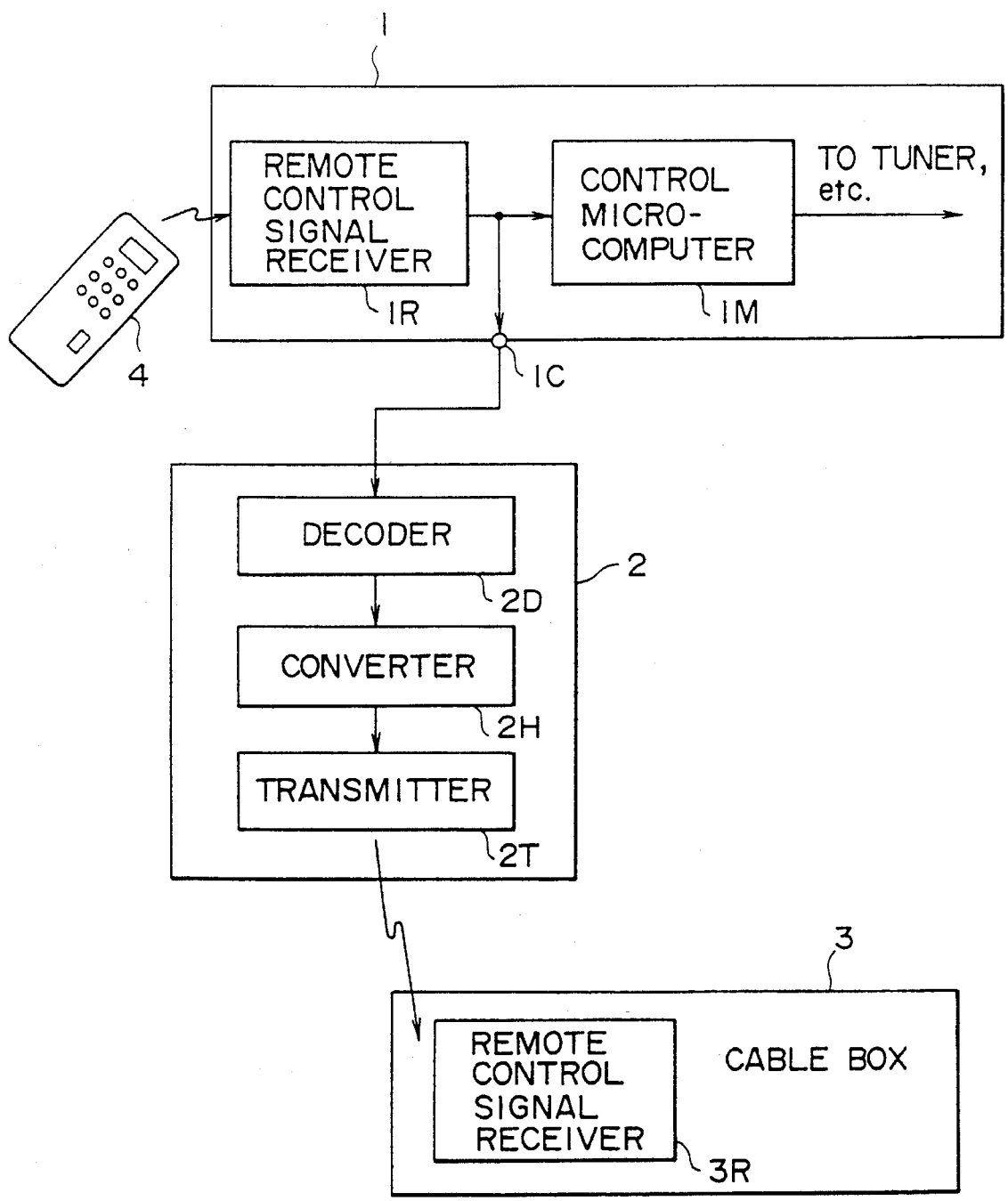
FIG. 17 is a block diagram illustrating a constitution of a conventional receiving system.

Referring to FIG. 15(C), it will be apparent that, when the transmitter 30 is placed with a cover 314A down, the cover 314A may be tapered towards its front end in cross section opposite the end at which a base 314B is attached, thereby tilting the base 314B towards the vertical line passing the center of the support area. It will also be apparent, as shown in FIG. 15(D), that a cover 315A may be tapered off at the end in cross section opposite to the end at which a base 315B is attached, thereby tilting the base 315B when the transmitter 30 is placed with the cover 315A down.

In the above-mentioned embodiment, the CB control transmitter 30 is placed on top of the cable box 20 with the base of the casing of transmitter 30 down and the cover facing the remote control signal receiver 24 of the cable box 20. It is apparent that the base may be inserted in a gap under the cable box to set the cover to the remote control signal receiver. It is also apparent that the casing of the CB control transmitter has no base and only a thin-box type cover containing the decoder 31, the code converter 32, and the infrared transmitter 33 can be detachably mounted on the receiver of equipment under control directly with adhesive tape.

It should be noted that, in the above-mentioned embodiment, the decoder 122 and the encoder 123 for the remote control signals are provided separately from the operation controller 120, but it is also possible to make a microcomputer-based operation controller additionally perform remote control signal RC1 decoding and encoding functions. Likewise, it is apparent that the operation controller may have the switching capability provided by the switch circuit 124 in order to switch the mode in which the remote control signal RC1 is processed by software to be output to the a mode in which the remote control-signal RC1 is decoded and encoded to be output as the remote control signal RC2.

In the above-mentioned embodiment, the output signal of the cable box 20 is converted to three channels of broadcast waves to be supplied to the antenna input terminal 10a of the television receiver 10. It is also apparent that, if the television receiver 10 is provided with a video signal output terminal and a sound signal output terminal and the television receiver 10 is provided with a video signal input terminal and a sound signal input terminal for the cable box, these video signal and sound signal output terminals and input terminals may be interconnected. If the input terminals and the output terminals are interconnected and when the cable box receive mode is selected, the operation controller performs input select control in the television receiver 10 so that an input signal coming from the above-mentioned video signal input terminal and sound signal input terminal for the cable box is selected.

In the above-mentioned embodiment, the remote control signals are transmitted from the remote commander 40 to the television receiver 10 in a wireless manner. It is apparent that the present invention may also be applied to a case in which the remote control signals are transmitted from the remote commander to the television receiver 10 over a control signal transmission line.

Likewise, the remote control signals can be transmitted from the transmitter 30 for controlling external apparatus to the cable box 20 not in a wireless manner but via a control signal transmission line.

It is also apparent that the remote control signals RC1 and RC2 can be transmitted from the television receiver 10 to the transmitter 30 for controlling external apparatus not over the cable 50 but in a wireless manner using infrared or ultrasound radiation.

In the above-mentioned examples, the remote commander for the television receiver is also used to remotely control the cable box. It is apparent that the present invention may also be applied to a case in which a remote command for a VTR is used to remotely control the cable box and the television receiver. Namely, the present invention is applicable to any case in which a remote commander of one of two video signal receiving apparatuses each having a tuning capability for selectively receiving television signals controls the other apparatus remotely.

The present invention may be embodied in other specific forms without departing the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A video signal receiving system, comprising:

a tuner for selecting a video signal of one channel from a plurality of video signals corresponding to a respective plurality of channels coming from a receiving antenna;

a control signal generator for generating a first control signal in response to an operation by a user;

an operation controller for generating a second control signal from said first control signal coming from said control signal generator;

a control signal selecting circuit for selecting one of said first control signal and said second control signal; and control signal output means for supplying one of said first control signal and said second control signal coming from said control signal selecting circuit to an external apparatus;

said video signal receiving system having a first receiving mode in which a video signal of one channel from the; plurality of video signals corresponding to the plurality of channels coming from said receiving antenna is selectively received and a second receiving mode in which a video signal coming from said external apparatus is received instead of the video signals coming from said receiving antenna; wherein, in said second receiving mode, if said first control signal is a predetermined signal, said operation controller performs control so that said control signal selecting circuit is switched from a state for selecting said first control signal to a state for selecting said second control signal and to transmit a selected one of said first control signal and said second control signal coming from said control signal output means to said external apparatus.

2. A video signal receiving system, comprising:

a first video signal receiving apparatus;

a second video signal receiving apparatus;

a transmitter for controlling an external apparatus;

said first video signal receiving apparatus comprising;

a tuner for selectively receiving a video signal of one channel of video signals of a plurality of channels;

transmitting means for transmitting said video signal of one channel to said receiving apparatus; and a control signal receiver for receiving a control signal coming from said transmitter for controlling said external apparatus;

said second video signal receiving apparatus comprising;

a tuner for selectively receiving a video signal of one channel of video signals of a plurality of channels coming from a receiving antenna;

a control signal generator for generating a first control signal in response to an operation by a user;

an operation controller for generating a second control signal from said first control signal coming from said control signal generator;

a control signal selecting circuit for selecting one of said first controls signal and said second control signal; and control signal output means for supplying one of said first control signal and said second control signal coming from said control signal selecting circuit to said transmitter for controlling external apparatus;

said second video signal receiving apparatus providing a first receiving mode in which a video signal of one channel of video signals of a plurality of channels coming from said receiving antenna is selectively received and a second receiving mode in which the video signal coming from said first video signal receiving apparatus is received, wherein, in said second receiving mode, if said first control signal is a predetermined signal, said operation controller performs control so that said control signal selecting circuit is switched from a state for selecting said first control signal to a state for selecting said second control signal to transmit one of said first control signal and said second control signal to said transmitter for controlling external apparatus; and said transmitter for controlling external apparatus comprising;

a signal converter for forming a third control signal from one of said first control signal and said second control signal coming from said control signal output means of said second video signal receiving apparatus; and a control signal transmitter for transmitting said third control signal to said first video signal receiving apparatus to control a selectively received state of said selected first video signal in said first video signal receiving apparatus.

3. A video signal receiving apparatus according to claim 2, wherein said first video receiving apparatus selectively receives the video signal of one channel of video signals of a plurality of channels coming over a cable.

4. A video signal receiving system according to claim 2, wherein said control signal transmitter of said transmitter for controlling external apparatus comprises a wireless transmitter for transmitting said third control signal in a wireless manner and said first video signal receiving apparatus has a wireless receiver for receiving said third control signal coming in the wireless manner.

5. A video signal receiving system according to claim 2, wherein said signal generator of said second video signal receiving apparatus comprises a control signal transmitter for transmitting a remote control signal in a wireless manner.

6. A video signal receiving system according to claim 4, wherein a casing of said transmitter for controlling external apparatus has a shield for said wireless receiver in order for said wireless receiver of said first video signal receiving apparatus to receive only said third control signal coming from said wireless transmitter and not to receive any other signals than said third control signal coming from said wireless transmitter.

* * * * *

UNITED STATES PATENT AND TRADEMARK OFFICE
CERTIFICATE OF CORRECTION

PATENT NO. : 5,477,275
DATED : December 19, 1995
INVENTOR(S) : Kenichiro Toyoshima and Hirofumi Usui It is certified that error appears in the above-indentified patent and that said Letters Patent is hereby corrected as shown below:

Col.3, line 46, change "externals" to --external--
Col.5, line 42, after"a" delete "-"
Col.7, line 61, delete ","
Col.10, line 42, after "found" insert --to be--
Col. 11, line 19, change ".Controller" to --controller--
        line 35, after "decoder" delete ":"

Col.15, line 54, after "control" delete "-"

Col 17, line 20, change ";" to --:--
        line 32, change "controls" to --control--
Col.18, line 10, change ";" to --:--

Signed and Sealed this

Twenty-eighth Day of October, 1997

Attest:

BRUCE LEHMAN

*Attesting Officer*    *Commissioner of Patents and Trademarks*